W. BRUNNER.
ICE HARVESTER.
APPLICATION FILED OCT. 20, 1913.
1,145,670.
Patented July 6, 1915.
2 SHEETS—SHEET 2.
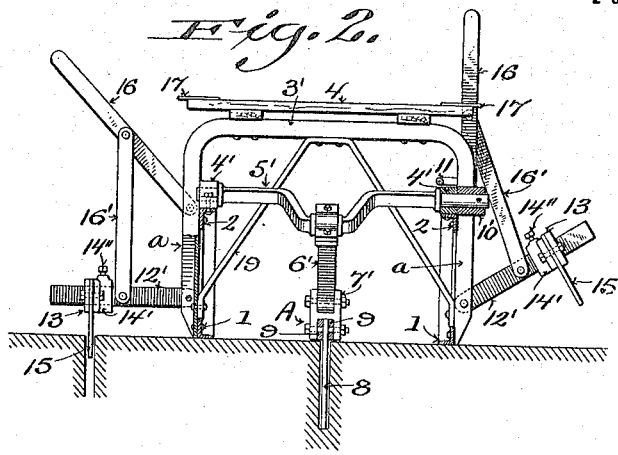
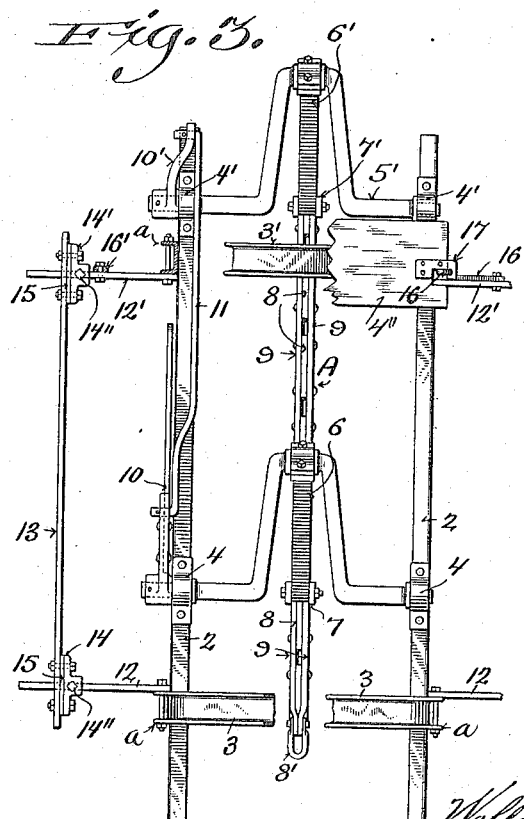

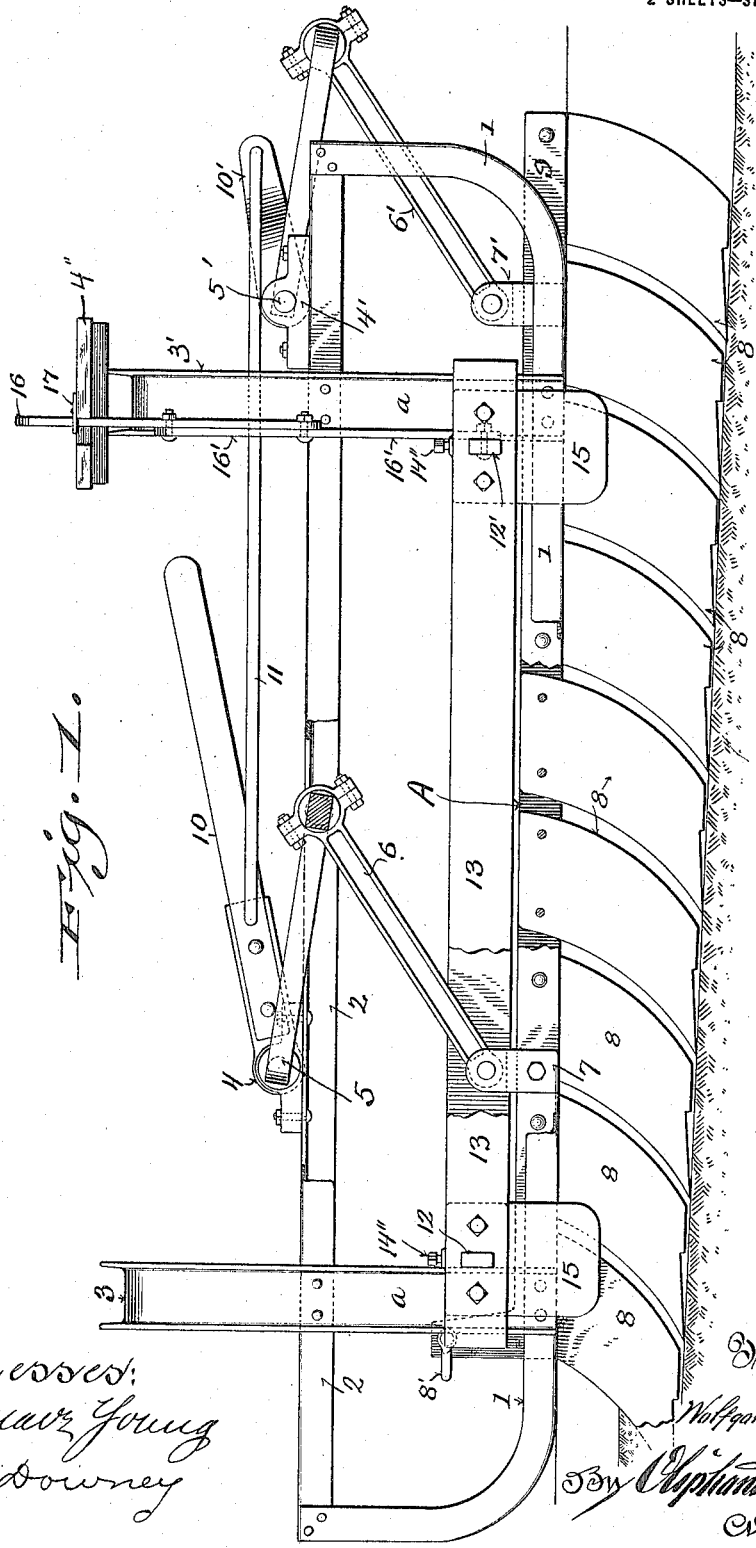

UNITED STATES PATENT OFFICE.

WOLFGANG BRUNNER, OF TWO RIVERS, WISCONSIN.

ICE-HARVESTER.

1,145,670.  Specification of Letters Patent.  Patented July 6, 1915.

Application filed October 20, 1913. Serial No. 796,133.

*To all whom it may concern:*

Be it known that I, WOLFGANG BRUNNER, a citizen of the United States, and resident of Two Rivers, in the county of Manitowoc and State of Wisconsin, have invented certain new and useful Improvements in Ice-Harvesters; and I do hereby declare that the following is a full, clear, and exact description thereof.

My invention refers to ice harvesters, its object being to provide a simple, economical and light draft riding plow for partially cutting ice into strips or blocks. The construction and arrangement of the plow is such that a frame embodying the runner supports carries a pair of lever-controlled crank-shafts, the same being linked to a floating beam having a gang of cutter blades in connection therewith and to the forward end of which beam the draft is applied, whereby said beam is caused to drag the runner-supported frame through its link connection therewith. The frame also carries vertically movable right and left gage mechanisms, either of which may be thrown into operation to cause gage shoes to track within a previous kerf, whereby the succeeding cut is gaged. Each gage mechanism is also capable of adjustment as to width of the cut relative to the cutter blades, the said mechanisms being suspended from the frame under control of raising and lowering levers, whereby one or both may be elevated, together with the gang of cutters, in order to freely turn the machine at the end of a field of ice preparatory to starting a new cut.

With the above objects in view the invention consists in certain peculiarities of construction and combination of parts as hereinafter set forth with reference to the accompanying drawings and subsequently claimed.

In the drawings Figure 1 represents a side elevation partly broken away and partly in section of an ice harvester or plow embodying the features of my invention; Fig. 2, a rear view of the same partly broken away and in section to more clearly illustrate structural features, and Fig. 3, a plan view of the harvester with parts broken away and in section to show certain structural features in detail more clearly.

Referring by characters to the drawings, 1, 1, represent angle-iron runners, the upturned ends of each of which are longitudinally connected by angle-iron reach-bars 2, 2. The reach-bars, together with the runners, are cross-connected by front and rear yoke-beams 3, 3', respectively. The transverse stretch of the rear yoke-beam 3' serves as a support for a seat-board 4'' for the convenience of the driver, it being understood that the entire structure described forms a rigid skeleton frame. The forward ends of the reach-bars 2, 2', are provided with alined boxes 4 for the reception of the ends of a crank-shaft 5 and the rear ends of said reach-bars are provided with similar boxes 4', into which is journaled a companion crank-shaft 5', the same being arranged just back of the yoke-beam 3'. Each of the crank shafts 5, 5', are centrally disposed relative to the frame and their respective pins carry links 6, 6', the opposite ends of which links are in pivotal union with eared brackets 7, 7', that extend upwardly from a draft beam A carrying a series of alined flat cutter blades 8. The draft beam A is built up from a pair of parallel strips 9, between which the series of cutter blades 8 are set, the latter being clamped by bolts or rivets which pass through the blades and strips. The composite draft beam A, so equipped, is designed to regulate the depth of cut by abutting or sliding upon the surface of the ice when the cutting blades are traveling their full depth, attention being called to the fact that said cutting blades are pointed and that their front edges are recedingly curved to thus cause their points to cut downward under draft strain.

One end of the forward crank-shaft 5 has secured thereto a hand-lever 10 and the corresponding end of the rear crank-shaft 5' carries a lever 10', which lever is connected to the hand-lever 10 by a rod 11. Hence by this lever connection the gang of cutting blades can be raised free of the surface upon which the frame runners travel, the movement being effected by rocking the hand-lever forward, whereby the crank-pins of the respective crank-shafts are swung upward and over the centers of oscillation to thus lift the cutter-carrying draft beam and lock the same in elevated positions due to the fact that the crank-pins, as stated, are swung over their centers, in which position the rear crank-shaft lever 10' is stopped against further forward movement by engagement with the adjacent yoke-beam.

Pivotally secured to the vertical legs 4 of each yoke-beam and projecting outwardly from the frame are front and rear companion sets of arms 12, 12', respectively, and each pair carries an adjustable gage-bar 13. These gage-bars are apertured at their front and rear ends and are attached to front and rear head-blocks 14, 14', respectively, having apertures which register with the gage-bar apertures, whereby the said bars, together with their carrying heads, are slidably adjustable upon the arms 12, 12', to thus regulate the width between gage-shoes 15 carried by said gage-bars and the gang of cutter-blades. These gage-shoes are interposed between the gage-bars and heads and are provided with apertures registering with the head and gage-bar apertures, whereby the entire assemblage is moved in or out upon that arm to which it is fitted, it being understood that the bolts for securing the heads and gage-bars together also pass through the shoes and clamp the parts securely. The rear pair of gage-carrying arms 12' are connected to lifting levers 16, 16, by means of links 16'. The lifting levers 16, as shown, are pivotally connected to the vertical legs $a$ of the rear yoke-beam.

Referring to Fig. 2 of the drawings, one of the gage mechanisms is shown lifted from the surface of the ice and the opposite gage mechanism is shown in a working position with the gage shoes 15 fitted in a previous kerf made by the cutter-blades, in which position the said gage shoes cause the machine to track parallel with the previous kerf to thus regulate the width of the ice strip which is plowed by the gang of cutters as the machine travels forward, it being understood that the depth of cut may, in some instances, require the cutting operation to be repeated several times in one kerf. It is also apparent that only one guide mechanism is utilized at a time and that, to adjust the width between saw kerfs, the gage-bar, together with its connected heads, is slid in or out upon its supporting arms 12, 12', and locked in the desired position by means of set-screws 14'', which set-screws pass through the heads 14, 14', and impinge against their respective arms. When it is desired to lift one or both of the gage mechanisms, the controlling levers thereof are drawn inwardly toward the frame, whereby the gage-bar supporting arms are raised to such a position that the bottom edges of the gage-shoes are cleared from the surface of the ice, in which position the lifting levers are locked by engagement with notched plates 17, which plates project from the ends of the seat-board 4'', the said levers being sprung slightly to permit this locking operation. It is also apparent that when the gage mechanism is in its operating position, it is free to ride or float in a vertical direction in parallel relation to the cutting blades. The cutting blades, when released and in their working positions, are also free to ride or float in a vertical direction and the draft being applied thereto the frame will be caused to follow through its crank-shaft and link connection to the draft beam. In order to add rigidity to the frame in a transverse direction, as best shown in Fig. 2, the yoke-bars are braced by obliquely disposed straps 19, which straps connect the transverse stretches of the yoke-bars with their vertical legs $a$.

It will be noticed that the cutting blades are increased in depth from the first to the last of the series, this being desirable in order to effect a progressive cut whereby each blade presents a working face.

I claim:

1. An ice harvester comprising a frame having runners, transversely disposed front and rear crank-shafts mounted upon the frame, the crank portions of the shafts being centrally disposed with relation thereto, a free floating actuating lever secured to one end of each crank-shaft, a tie-rod connecting the levers, a draft-beam, front and rear links having ends pivotally secured to the draft-beam and to the corresponding front and rear crank portions of each crank-shaft, whereby said draft-beam is capable of free vertical play in connection with movement of the crank-shafts, and cutter-blades carried by said draft-beam.

2. An ice harvester comprising a runner frame, front and rear crank shafts having their ends journaled upon the frame, the crank portions of the shafts being centrally disposed and extending rearwardly in their working position, free floating lifting mechanism connecting ends of the crank-shafts, a cutter-carrying draft-beam, and front and rear links connecting the draft-beam and crank portion of the crank shafts, the said links being extended rearwardly from their beam connection whereby an acute angle is formed between each link and the crank portion of its carrying crank shaft when the mechanism is in its working position.

In testimony that I claim the foregoing I have hereunto set my hand at Two Rivers in the county of Manitowoc and State of Wisconsin in the presence of two witnesses.

WOLFGANG BRUNNER

Witnesses:
H. C. WIEKE,
H. R. SCHWAKE.